United States Patent [19]

Ronk et al.

[11] Patent Number: 4,697,132
[45] Date of Patent: Sep. 29, 1987

[54] REDUCTION OF VOLTAGE DROP IN POWER DISTRIBUTION SYSTEMS AND OF LOSS OF MOTOR TORQUE

[75] Inventors: Leroy B. Ronk; Claude M. Hertz, both of Nokomis, Ill.

[73] Assignee: Ronk Electrical Industries, Inc., Nokomis, Ill.

[21] Appl. No.: 283,636

[22] Filed: Jul. 15, 1981

[51] Int. Cl.$^4$ .............................................. H02P 1/26
[52] U.S. Cl. ................................... 318/795; 318/794
[58] Field of Search ............... 318/778, 794, 795, 729; 361/15; 323/209

[56] References Cited

U.S. PATENT DOCUMENTS

| | | | |
|---|---|---|---|
| 3,424,971 | 1/1969 | Stackegard | 323/209 |
| 4,104,687 | 8/1978 | Zulaski | 361/15 |

OTHER PUBLICATIONS

Rose, A., "A Novel Approach for Thermo Mechanical Pulping (TMP) Refiner Motor Operation", Conference IEEE Conference Record of the 1979 Annual Pulp & Paper Industry Technical Conference, Pittsburgh, Pa., May 15-18, 1979.

*Primary Examiner*—David Smith, Jr.
*Attorney, Agent, or Firm*—Senniger, Powers, Leavitt and Roedel

[57] ABSTRACT

Apparatus and method for reducing the voltage drop in an electrical power distribution system during the starting of a multi-phase induction motor having stator windings supplied therefrom and for decreasing the loss in starting torque of the motor. A capacitor is provided for direct connection across each stator phase winding of the motor. These are electrically connected to the stator windings substantially simultaneously with the motor being supplied with power from the distribution system. These capacitors have a capacitance which exceeds that required to raise the no-load power factor of the motor to unity at running speed but is less than that which will correct the power factor of the motor to unity under locked rotor conditions. Preferably these capacitors are electrolytic-type capacitors and have a capacitance which will reduce the motor starting current by at least approximately 30%. When the motor has substantially reached its running speed, the capacitors are substantially simultaneously disconnected from the respective stator windings.

2 Claims, 11 Drawing Figures

REDUCTION OF VOLTAGE DROP IN POWER DISTRIBUTION SYSTEMS AND OF LOSS OF MOTOR TORQUE

BACKGROUND OF THE INVENTION

This invention relates to the reduction of voltage drop in electrical power distribution systems and to decreasing the loss in starting torque of motors supplied by such systems, and more particularly to reducing the voltage drop in such a system during the starting of large multi-phase induction motors and to decreasing the loss in starting torque of such motors.

There are many geographical areas remote from any electrical power generating station and from the nearest substation where large horsepower motors have to be installed. Such motors are needed, for example, in agricultural operations such as for grain driers and for powering pumps for irrigation, and also for oil wells and pipe lines, etc. These motors range from at least 25 and 50 hp. to 100 and 200 hp. sizes and may have to be located 5, 10, or perhaps 50 or more miles from the nearest substation. When such a highly inductive heavy motor load is initially energized, a sudden and exceedingly high inrush current is drawn (typically five to six times the full load current drawn by the motor while running) at a very low power factor. This high initial current gradually diminishes and the low power factor at starting improves as the motor speed rises to its normal operating or running level. This high inrush current principally comprises reactive current, or magnetizing current to generate the magnetic field required for operation of the motor. It causes a sag or drop in the line voltage and this is reflected back along the entire distribution system thus adversely affecting all the other customers supplied by that system. This has many ramifications including an attendant decrease in the starting torque capacity of the motor being energized. As the starting torque of an induction motor varies as the square of the applied voltage, even a 10–15% drop in the line voltage, which is far from unusual in such situations, will result in nearly a 20–30% loss in starting torque. Such loss of starting torque typically causes an increase in the time required to bring the motor up to running speed. As this time period will increase in an inverse relationship to starting torque, the excessive current load and voltage sag during motor starting will continue longer than the normal time required at proper line voltage levels. In many rural areas the distribution system, while able to carry the running load current of the system's motor loads, will be unable to sustain, without an unacceptable voltage drop, the starting load or magnetizing current of large horsepower motors as they are brought on the line. Also, this prolonged high current drain can exceed what the local supply wiring to the motor can safely handle. Another serious problem is that the starting torque of the motor may fall below that necessary to pick up its load, for example, a piston-type pump, and the motor will be inoperative.

Another disadvantage is the possible expense to the utility customer, particularly in those areas served by utilities which have rates which provide for extra charges based upon a current demand exceeding a certain level for a given time period each month. As many of the demand meters used by these utilities measure the apparent power in KVA and not real or actual power in KW, and the monthly time period that the excessive demand cannot exceed may be on the order of only a few minutes, a very substantial monthly charge can be entailed by cyclic operation of such large induction motors.

A number of approaches have been made toward resolving these problems. One technique is to energize the motor not directly from the line but through an autotransformer that will reduce the applied voltage to the motor during starting. While the current load and the voltage drop on the system are reduced, the motor power factor is worsened and the starting torque is sacrificed (in proportion to the square of the impressed voltage) by this technique. Moreover, the expense of such a transformer, $100 or more per hp., and the space required to accommodate such a transformer constitute decided drawbacks to this arrangement.

A substantial reduction in starting current may also be accomplished by "incremental" or "part-winding" starting (i.e., initially energizing only a portion of each stator winding and then additional portions), but this also dramatically reduces starting torque and, further, requires internal structural modifications of the motor and expensive switching control devices.

Another approach has been to have the motor stator windings connected in a wye configuration during starting and switching the connections to a delta configuration as running speed is achieved. This will reduce somewhat the starting current drawn by the motor and thus the dip in the line voltage, but again, as in the above approaches, as the effective voltage on the stator winding is thereby decreased the starting torque of the motor will also be sharply reduced. Additionally, the cost of the switching components required add significantly to the expense of this approach.

A further technique proposed to counteract this problem has been to connect capacitors across the distribution line ahead of the customer's distribution transformer which will step down the distribution voltage from say 22 KV to the usual 480 volts. Such a technique is described in a paper by W. E. Shula of the Texas Electric Service Company entitled "Starting Large Induction Motors With the Aid of Shunt and Series Capacitors", presented at the PIEA-PESA-PEPA Conference in Houston, Tex. on Apr. 21–25, 1974. This technique will reduce somewhat the distribution line voltage sag but it will not significantly reduce the loss of starting torque of the motor. This is because the high KVA load (due to the low power factor and high quadrature current during motor starting) is applied to the low voltage or secondary of the distribution transformer and is isolated from the power factor correction effected on the primary by the capacitors. Thus, the high circulating current in the secondary results in significant power losses and can cause a core saturation condition in the supply transformer. Moreover, these capacitors must have voltage ratings sufficient to permit them to be installed on such high voltage lines and therefore are electrostatic-type oil-filled capacitors. As they must be connected and disconnected from the distribution line at the beginning and end of the starting period of the motor, high voltage switching equipment and load protective devices must be utilized. These high voltage components are, of course, quite expensive.

Still another possible way of overcoming the problems of voltage dip in the electrical distribution system when starting large horsepower motors in remote locations would be to use a soft-start motor. Such motors are described in co-assigned U.S. Pat. Nos. 3,670,238 and 4,158,225 in which the resistance of the rotor is increased so that the in-rush current does not greatly exceed the full load running current. However, such motors involve special rotor construction which increases the cost over that of conventional induction motors which have starting currents 5-6 times running current and are classified under the National Electrical Code by the letters F, G and H. A comparable soft-start motor, which would have a starting current not much greater than the running current and would be classified as a code A motor. Also, these soft-start motors have a reduced starting torque. Moreover, only a very few of thid type motor are produced and in limited horsepower sizes. There are thousands of the conventional code F-H large induction motors in daily use and for these there has been no practical and satisfactory arrangement for counteracting the serious effects of large horsepower motor starting on both distribution system regulation and diminished motor starting torque.

SUMMARY OF THE INVENTION

Among the several objects of this invention may be noted the provision of an improved apparatus and method for reducing the voltage drop in electrical power distribution systems during starting of multi-phase induction motors and for decreasing the loss in starting torque of the motor; the provision of such an apparatus and method which require no internal modification of the motor but markedly improve the motor's performance during starting and do not alter the performance or characteristics of the motor during normal running opertion; and the provision of such an apparatus which is economical in cost, reliable in operation, and relatively compact in size.

In accordance with this invention apparatus which will reduce the voltage drop in an electrical power distribution system during the starting of a multi-phase induction motor having stator windings supplied therefrom and will decrease the loss of starting torque of the motor comprises a capacitor for direct connection across each stator phase winding of the motor by switching means which connect and disconnect the capacitors from the respective stator windings. Means are provided for controlling the switching means to simultaneously disconnect the capacitors from the respective stator windings when the motor has substantially reached its running speed. The capacitors have a capacitance which exceeds that required to raise the no-load power factor of the motor to unity at running speed but is less than that which will correct the power factor of the motor to unity under locked rotor conditions.

Also, in accordance with this invention a method is provided for reducing the voltage drop in an electrical power distribution system during the starting of the multi-phase induction motor having stator windings supplied therefrom and for decreasing the loss in starting torque of the motor. This method comprises connecting the stator windings of the motor to the distribution system substantially simultaneously with connecting capacitors directly across each winding, the capacitors having a capacitance which exceeds that required to raise the no-load power factor of the motor to unity at running speed but is less than that which will correct the power factor of the motor to unity under locked rotor conditions, and thereafter disconnecting the capacitors from the respective stator windings when the motor has substantially reached its running speed.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
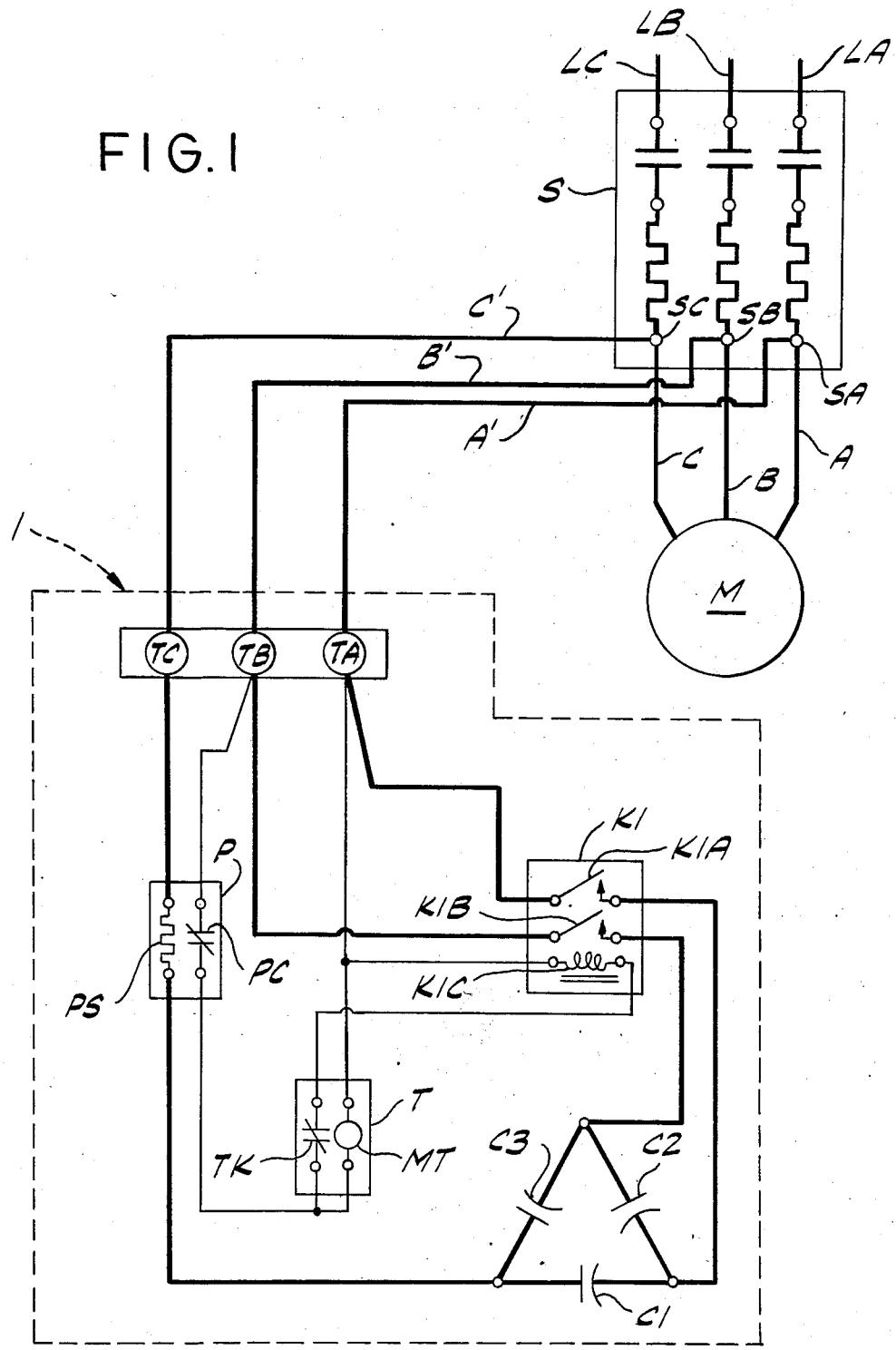
FIG. 1 is a circuit schematic of apparatus of the present invention shown connected to a three-phase motor supplied by an electrical distribution system.

Referring now to the drawings, and more particularly to FIG. 1, a large (i.e., 25 hp. or greater) three-phase induction motor is generally indicated at M. Electric power for this motor is supplied from an electrical power distribution system represented by conductors LA, LB and LC via a conventional magnetic motor starter S and conductors A, B and C which interconnect starter ouput terminals SA, SB and SC with the respective motor stator windings (connected in delta). Apparatus of the present invention, indicated generally at 1, has three terminals TA, TB, and TC which are connected to the motor stator windings by conductors A', B' and C'. At C1, C2 and C3 are shown three capacitors (each usually comprising a bank of interconnected individual electrolytic-type capacitor units) for direct connection (shown here in delta) across the three respective motor stator windings by means of normally open contacts K1A and K1B of a contactor K1 having a coil K1C. The actuation of contactor K1 is controlled by a timer T having a motor MT and contacts TK. Such timers are conventional and are commercially available from Timemark Co. of Tulsa, Oklahoma and Controls Corporation of American of Chicago, Ill. Electrical power is supplied from power phase A,B to the timer and coil K1C via normally closed contacts PC of an overlaod protector P. Contacts PC are responsive both to the magnitude of current drawn through a sensing element PS (typically a small resistance heater element and a bimetal element which actuates contacts PC) and the length of time it is drawn exceeding a preselected integrated current-time level (i.e., the product of the period of time the current flows and the square of that current) thereby to open, deenergizing contactor K1 and disconnecting the capacitors from the stator windings. Such overload protectors are commercially available from various sources including Furnal Electric Co. of Batavia, Ill.

When starting contactor S is actuated to supply three-phase power from the electrical distribution system via the usual distribution transformer (not shown) to motor M, power is also supplied through conductors A', B' to timer motor MT to initiate its timing cycle and, through the timer contacts TK, which are closed at the beginning of each timing cycle, to energize coil K1C to close contacts K1A and K1B thus directly connecting the capacitors C1, C2 and C3 across respective stator windings of motor M. These contacts K1A and K1B, which constitute switching means for the capacitors, remain closed until the end of the timing cycle which is preset to approximate, but preferably not exceed, the time period required for the motor to reach its running speed. At the end of the timing cycle the contacts TK of timer T, which constitutes means for controlling the actuation of contacts K1A and K1B, reopen thereby disconnecting the capacitors from the motor.

Figure 2A:
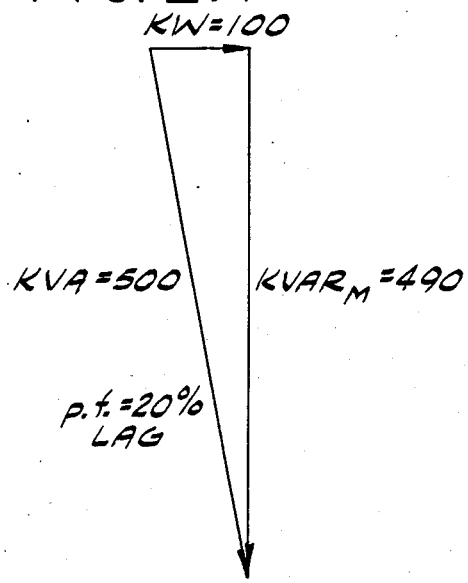
FIG. 2A is a vector diagram or phasor representation simulating the relationship of the components of electrical power supplied by the distribution system in starting a multi-phase induction motor having a power factor of 20% when initially energized.

A typical large three-phase induction motor will be a code F, G or H motor with an initial starting current (which is essentially the locked rotor current of the motor) of 5-7 times its full load running current. The motor load at starting is the equivalent of a transformer with a shorted secondary. The power factor of the motor is quite low under these conditions as this current will be out of phase with the applied voltage. Thus, a very large starting or magnetizing current is drawn at a low power factor requiring the supply of reactive power (KVAR) which greatly exceeds the real power (KW). This is illustrated in FIG. 2A where an exemplary starting power factor of 20% (lagging) is assumed and which would require supplying the motor, when energized, with 490 KVARs of reactive power. Real power of 100 KW is also drawn from the system resulting in an applied load of 500 KVA (apparent power). Depending on the line length and loss and the existing load conditions on the distribution system, and the characteristics of that system, the starting KVA load of a large induction motor can cause a 25-30% or more sag or drop in the line voltage at the motor. This is reflected back along the distribution system through the distribution transformer to the substation or generating station. As the atarting torque of the motor varies as the square of the voltage applied there will be a concomitant decrease of starting torque which usually prolongs the time period required for the motor to come up to running speed. If the starting torque is not great enough, the motor may not be able to pick up its load (particularly if it is a high inertia load) and will be inoperative.

As the motor rotor accelerates and generates an increasing counter e.m.f., the magnetizing current requirements diminish and the motor power factor rises. This is represented in FIG. 2B where the magnetizing current and thus the reactive power required by the motor ($KVAR_M$) has fallen to 170 KVARs, thereby reducing the apparent power to 200 KVA, the real or actual power remaining generally constant at 100 KW and the power factor rising to 50% (lagging) at this intermediate speed.

Figure 2B:
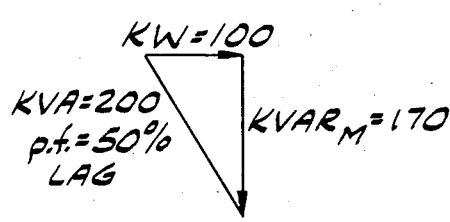
FIG. 2B is a representation similar to FIG. 2A to these relationships when the motor speed has attained an intermediate speed and is rising toward its operating speed.
Figure 2C:
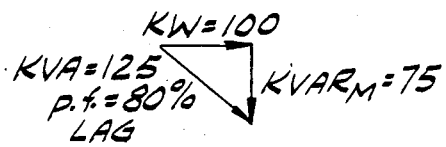
FIG. 2C is a representation similar to that of FIG. 2B illustrating these relationships when the motor is approaching its operating or running speed.

FIG. 2C illustrates the further decrease in magnetizing current drawn as the rotor speed increases and substantially reaches its operating level. The reactive power required has dropped to 75 KVARs and the apparent power being drawn from the line or distribution system is thereby reduced to 125 KVA with the motor power factor rising to 80% (lagging) at running speed.

It should be understood that the real power, although shown constant at 100 LW in FIGS. 2A-C actually changes somewhat as the rotor accelerates from its rest position. This is because of line voltage regulation factors and because the motor initially appears to the line to be a somewhat larger horsepower load, but these are transitory and not substantial factors. Thus the modest change in the motor's real power requirement as it accelerates from its rest position is not shown.

Figure 3A:
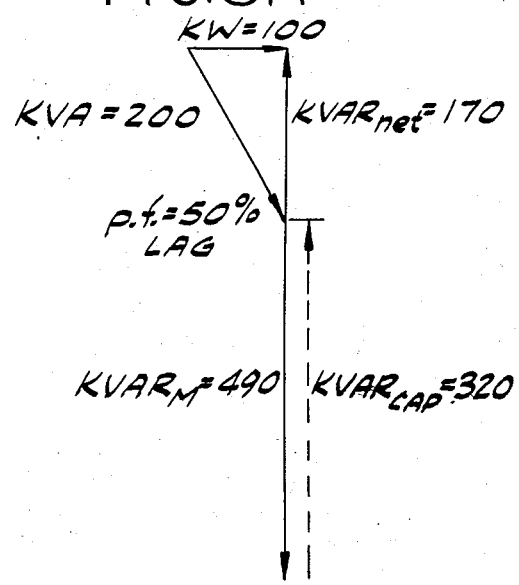
FIGS. 3A-3C are vector diagrams similar to those of FIGS. 2A-2C illustrating the relationship of the components of electrical power when the apparatus of the present invention is used.
Figure 3B:
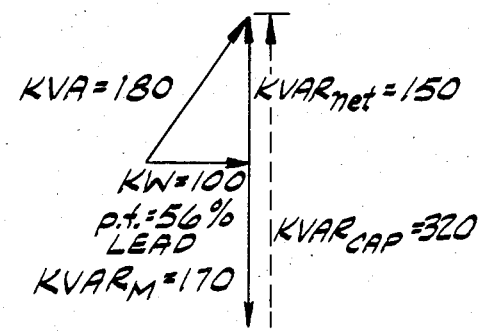
Figure 3C:
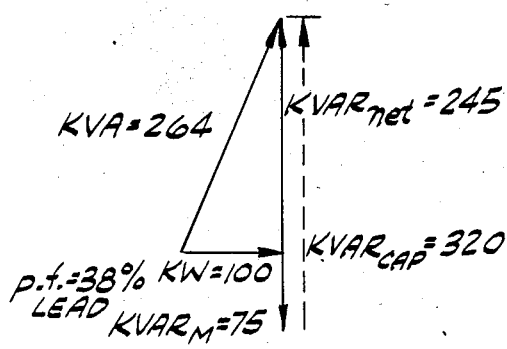

In accordance with this invention the voltage drop on the distribution system is reduced during this motor starting period and the loss of starting torque is decreased by connecting capacitors C1, C2 and C3 across the stator windings of motor M substantially simultaneously with the actuation of the starting contactor S. Operation of apparatus of this invention is illustrated by FIGS. 3A-C in which the same motor parameters employed in FIGS. 2A-C are utilized but with the apparatus of this invention being used. The capacitive reactance of the capacitors supplies motor magnetizing current and power in the form of reactive power (leading), an exemplary effect of which is illustrated in FIG. 3A in which 320 KVAR (capacitive) power is supplied by the capacitors which effectively reduces the initial 490 KVARs (inductive) supplied by the distribution system to a net reactive power ($KVAR_{net}$) requirement of 170 KVARs (inductive) with a resultant of 200 KVA of apparent power being supplied from the distribution system, the real power of 100 KW remaining the same. That is, the capacitors supply magnetizing current (leading) to the motor which reduces the quadrature or reactive current (lagging) drawn from the distribution system by the inductive motor stator windings during this critical starting period. Thus, the power factor of the load constituted by the motor and the capacitors at starting would be increased from 20% to 50% and the apparent power drawn from the system would be reduced from 500 KVA to 200 KVA. While the power factor of the motor itself is not actually changed, the performance of the motor is markedly improved as the starting power factor of the load (motor plus capacitors) is increased from 20% to 50% (lagging).

As the motor speed increases the capacitors continue to supply magnetizing current and the reactive current (inductive) and power drawn by the motor decreases to 170 KVAR (lagging). The connection of 320 KVARs capacitive reactance across the stator windings causes the load current (motor plus capacitors) to become leading with a net reactive power ($KVAR_{net}$) requirement of 150 KVARs (capacitive). The resultant KVA load on the line is 180 KVA but this is capacitive and the power factor is 56% (leading), as represented in FIG. 3B. Prior to the motor accelerating to the intermediate speed which is illustrated in FIG. 3B and a the motor KVARs (inductive) decrease to 320 KVARs from 490 KVARs and thereby become equal to or are counteracted by the 320 KVAR (capacitive) of the now-connected capacitors, the load as seen by the distribution system passes through a condition of unity power factor. As the reactive power requirements of the motor decrease further with increasing rotor speed the net reactive current becomes increasingly capacitive or leading as represented in FIG. 3C. There the motor reactive power requirements ($KVAR_M$) have dropped to 75 KVAR (inductive) and the net reactive power ($KVAR_{net}$) required by the load due to the 320 KVAR of capacitive reactance rises to 225 KVAR (capactive). The power factor of the combined motor and capacitor load is then 38% (leading) as the running speed of the motor is approximated. Again, it should be understood that in practice the actual power and the $KVAR_{cap}$ will not remain constant because of factors such as the rising line voltage as the $KVAR_M$ requirements decrease, which eill cause some increase in $KVARs_{cap}$. However, as these variations are not consequential the $KVAR_{cap}$ has been shown as constant.

Figure 4:
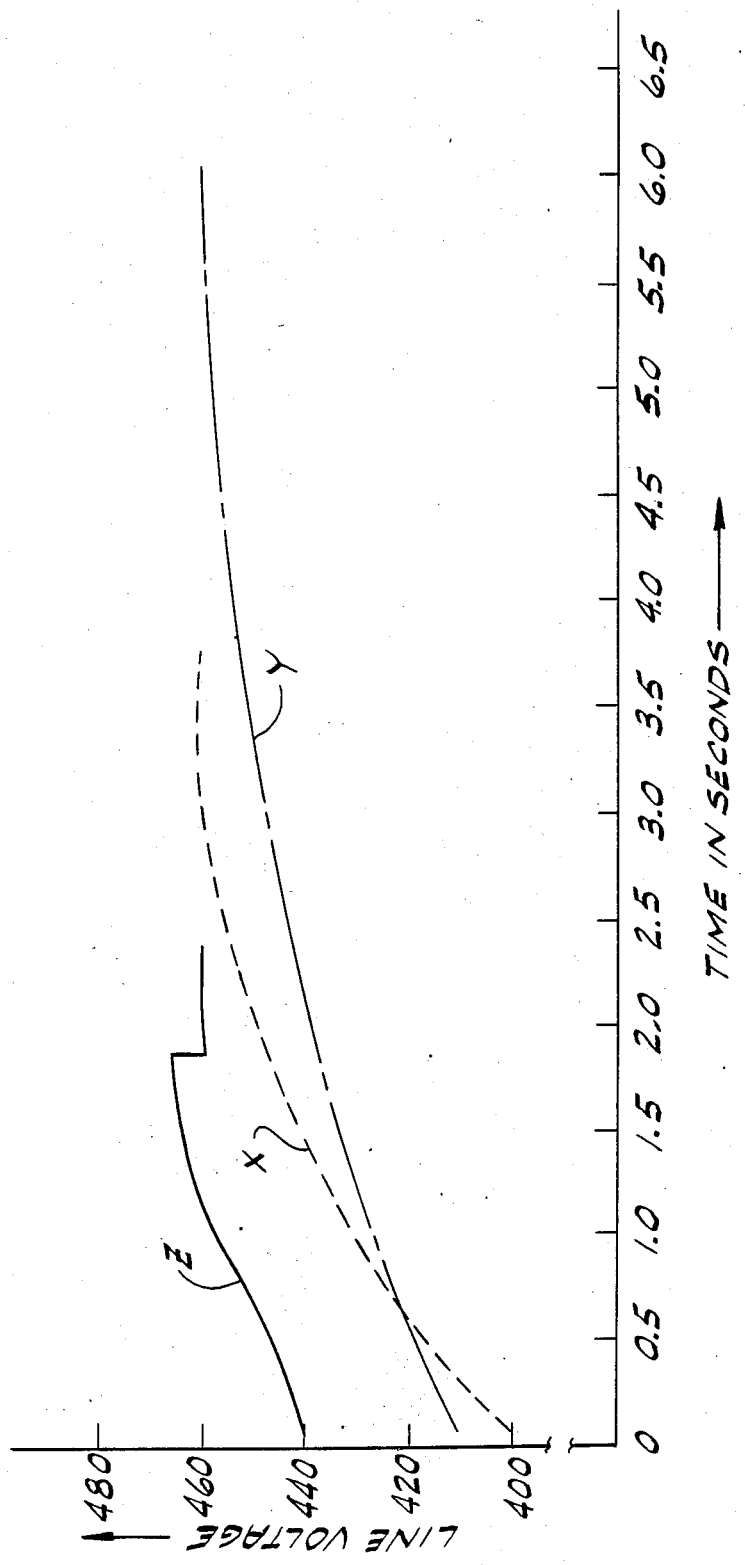
FIG. 4 is a graphical representation of a comparison of the relationship between the motor voltage and time as measured from the initial energization or starting of a multi-phase induction motor when the apparatus of this invention is and is not employed and when an autotransformer was used.

The improved performance of the motor with apparatus of the present invention utilized is further illustrated in FIG. 4 where the line voltage is plotted against time in seconds from the moment of closing of the motor starter contacts. The broken-line curve X illustrates both the drop in no-load line voltage from about 480 V to 400 V as a conventional code F, G, or H motor is started with a standard starter as well as the line voltage's gradual recovery to about 460 V as the motor accelerates to reach its running speed in about three seconds. Curve Y represents the comparable parameters when an auto-transformer starter (using the 86% tap) or a wye delta starter is used. There the initial applied voltage will drop to about 410 V and rise slowly as motor speed increases to its running level in about five seconds.

The solid-line curve Z illustrates the relationship between line voltage versus time when the motor is started with apparatus of the present invention. The line voltage drop is reduced to 440 V and because of the leading power factor attained by the motor load before the motor reaches its running speed the line voltage will actually rise somewhat above the 460 V which is the line voltage at running speed. An advantageous result of this is that the motor starting time is reduced to about two seconds as compared to a three second starting time without the apparatus of the present invention, or about six seconds with autotransformer starting. The leading power factor of the motor load during the terminal portion of the starting period is also beneficial in that it serves to compensate the low power factor of the typical electrical distribution system. Also, as the starting torque is a function of the square of the applied voltage it can be seen that the loss in starting torque as well as the loss in line voltage will be markedly reduced by utilizing apparatus of the present invention.

Apparatus 1 therefore improves the motor performance during this critical starting period and particularly effects an advantageous change in the characteristics of the load constituted by the motor during starting so that the initial KVA load at starting is so reduced that it will be comparable to that of a code A motor during this critical starting period rather than what it would be for a code F, G or H motor. This is accomplished without any internal modification of the motor and without affecting the characteristics of the motor during running operation because the capacitors are disconnected as the motor approaches its running speed.

As the timer is energized upon the closing of starting contactor S, contactor K1 will connect capacitors C1, C2 and C3 across the stator winding of the motor substantially simultaneously with power being supplied to them from the distribution system. That is, there is only a minimal delay between the closing of the starting contactor and the closing of the contacts K1A and K1B. This is usually only about 100 milliseconds, which represents a few cycles of 60 HZ power.

The capacitance of C1, C2 and C3 exceeds that required to raise the no-load power factor of the motor to unity at running speed but is less than that which will correct the power factor of the motor to unity under locked rotor conditions. Preferably C1, C2 and C3 have a capacitance which will reduce the in-rush or initial starting current of the motor by at least approximately 30%. For conventional code F, G and H motors this will be in the order of about 3.3 KVAR capacitance per motor horsepower. This translates to about 160 mfd/hp at 240 V or 40 mfd at 480 V. These values are approximate and can be varied considerably depending on how much starting current reduction and improved starting power factor is desired. These capacitors are preferably electrolytic-type units which are advantageously utilized rather than oil-filled electrostatic-type units inasmuch as the line voltages at which they are typically operated are usually not more than about 480 V or so. For substantially higher voltages, such as those on the primary or high voltage side of the distribution transformer oil-filled capacitors are generally employed because of the much higher voltage ratings possible per individual capacitor. Electrolytic-type capacitors are much less expensive and less bulky than comparable oil-filled units, the latter costing 5–10 times as much and being 5–10 times as large in volume as the electrolytic-type for equivalent capacitance and voltge ratings.

The timer is preset to open its contacts TK after a time period determined by the length of the starting time required by the particular motor to which apparatus 1 is to be connected. If the motor without apparatus 1 connected requires, for example, 20 seconds to come up to running speed, the timer would initially be set to complete its timing cycle at a somewhat shorter time period, say 10 seconds, inasmuch as the operation of apparatus 1 typically reduces starting time. If the motor then reaches its running speed in say 13 seconds, the timer is reset to open its contacts shortly before this time, for example, 11 seconds. It is preferred that the capacitors not remain connected longer than required to bring the motor nearly up to running speed as further continued application of the leading power factor load on the distribution system could increse the current and voltage levels at the motor and capacitors beyond desirable limits.

Apparatus of this invention has been tested under actual field conditions and several examples of the operational advantages of this apparatus are demonstrated by the following:

EXAMPLE 1

A 125 hp three-phase Siemans-Allis induction motor (1775 rpm;TEFC;Service Factor=1; FLA=143 A at 460 V; Frame 444 T; Design B, Code G) operating a crude oil piston pump (manufactured by Gaso Pump, Inc.) was found to draw 680 A and reduce the line voltage of the electrical distribution system as delivered to the motor from 480 V to 400 V under locked rotor conditions, essentially the conditions existing at the initiation of a motor starting cycle. The power factor was approximately 42% and the motor had a three second starting time. This motor was located about fifty miles from the nearest substation. By connecting the apparatus of this invention with a total capacitance of 417 KVARs (5000 mfd) to the starter motor winding substantially simultaneously with the closing of the starting contactor, the line current (locked rotor, i.e., initial starting current) decreased to 310 A. The current supplied by the capacitors was 520 A, the voltage did not fall below 440 V and the power factor was approximately 95%. The time required for the motor to come up to running speed was decreased by about one-third to approximately two seconds.

EXAMPLE 2

A 50 hp three-phase induction motor (Baldor -122 FLA - 230 V) located about one-fourth mile from the substation and operating a blower, was determined, on starting, to draw about 530 A and to cause the line voltage to drop from 238 V to 171 V. It required about 21 seconds to reach running speed and the power factor on starting was 51%. With apparatus of this invention connected to the motor (167 KVARs or 8000 mfd of capacitance) the line current was decreased to about 290 A. The current supplied by the capacitors was 350 A and the line voltage drop was reduced to 192 V. The power factor was also improved to 93% and the starting time was reduced to 11-12 seconds.

EXAMPLE 3

A 30 hp. U.S. three-phase induction motor (code G - 78 FLA) driving a factory air compressor, when starting, drew 385 A and caused the line voltage to drop from 238 V to 210 V. It took about 2½ seconds for the motor to come up to running speed. By connecting the apparatus of this invention to the motor (100 KVARs or 4800 mfd of capacitance) the line current on starting was 268 A, the capacitor current was 203 A and the line voltage dropped only to 224 V. The time reuired for the starting period was about 1½ seconds.

EXAMPLE 4

A 40 hp. Baldor three-phase motor (Code G - 230/460 V - FLA 96/48 - PF 88%) used to power a grain drier and located about 360 feet from the electrical service entrance drew at least 660 A starting current, dropping the line voltage from 225 V to 200 V and required about 20 seconds to come up to running speed. When the apparatus of the present invention was connected to the motor (134 KVARs or 6400 mfd of capacitance) the line current on starting was reduced to about 400 A, the capacitor current was 320 A and the line voltage dropped only to 212 V. Starting time remained about twenty seconds. The timer of this apparatus was set to switch out the capacitors at fifteen seconds.

Figure 5:
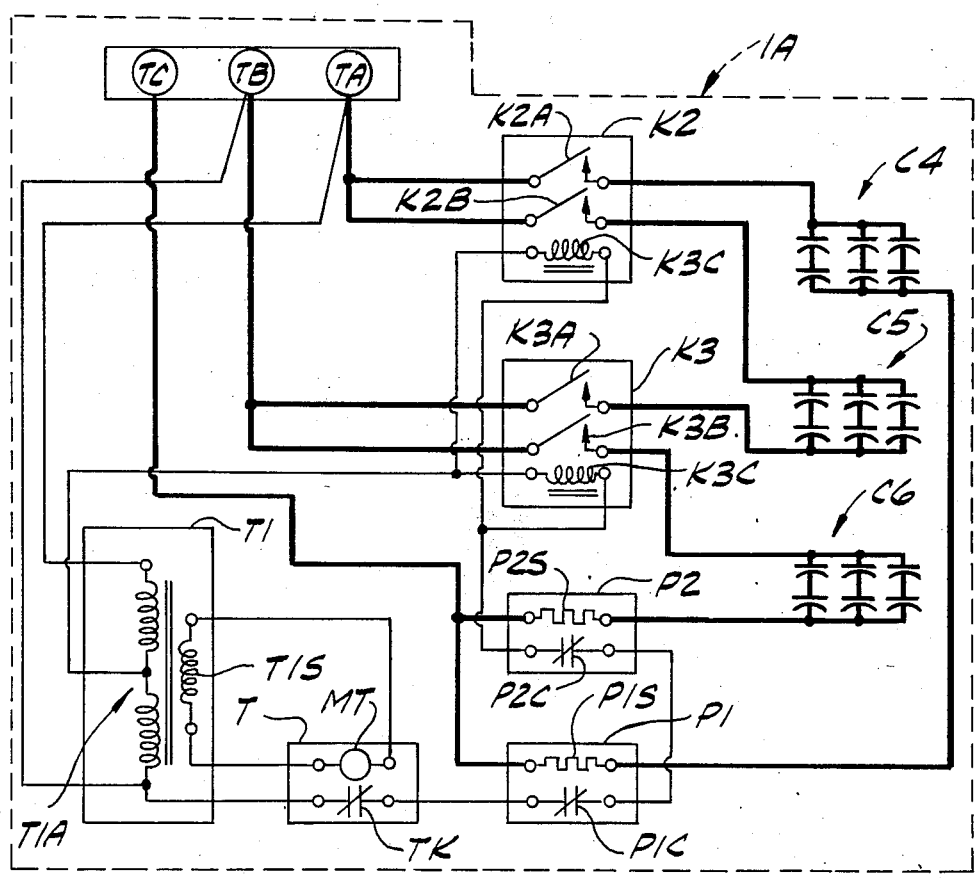
FIG. 5 is a circuit schematic of an alternate embodiment of apparatus of the present invention.

FIG. 5 illustrates at 1A an alternate embodiment of the apparatus of this invention which differs from that shown in FIG. 1 principally by utilizing two capacitor switching contactors K2 and K3 rather than one; using two overload protectors P1 and P2 instead of one; and in employing a transformer T1 to reduce the line voltage as applied to the motor M and the capacitors so that lower voltages will be supplied to the timer motor MT and the coils of contactors K2 and K3. In this instance the voltage across one-half of T1's centertapped primary T1P is applied to a series circuit including normally closed contacts TK of timer T and the normally closed contacts P1C and P2C of protectors P1 and P2 and the coils K2C and K3C (shunt-connected). Timer motor MT is energized from the transformer secondary T1S to maintain its contacts TK closed after initial energization of MT for a predetermined period of time approximating the starting time of motor M. Capacitors shown at C4, C5 and C6 (each more specifically depicted as being constituted by banks of capacitor units) are connected across the stator windings of motor M by contacts K2A, K2B, K3A and K3B substantially simultaneously with actuation of the starting contactor S. In apparatus 1A of this FIG. 3 embodiment the capacitor current magnitudes at both terminals TC and TB are sensed by elements P1S and P2S, respectively, of overload protectors P1 and P2 rather than sensing capacitor current only at TC as in apparatus 1. Thus if capacitor current as conducted through terminal TA or TC exceeds a selected integrated current-time level, the associated contacts P1C or P2C will open to deenergize both contactors K2 and K3.

Figure 6:
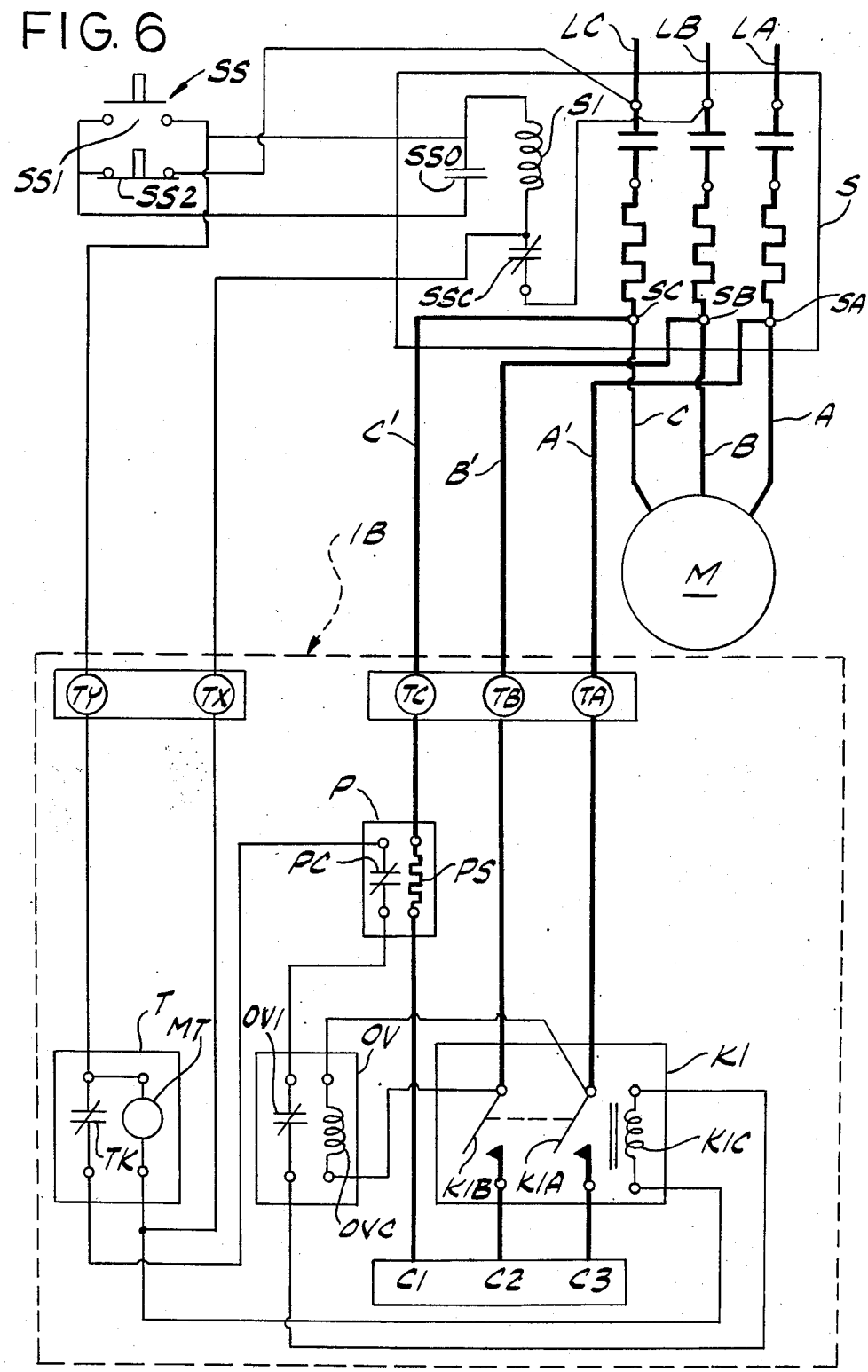
FIGS. 6 and 7 are circuit schematics of additional embodiments of apparatus of the present invention.

FIG. 6 illustrates still another embodiment 1B of this invention which differs from apparatus 1 and 1A of FIGS. 1 and 5 in two principal aspects. First, the coils of the capacitor switching contactor K1 and the starting contactor S are energized simultaneously by closing contacts SS1 of a manual start switch SS which is connected to coil S1 of starting contactor S by a conventional holding or latching circuit comprising normally open contacts SSO and normally closed contacts SSC thereof. Thus starting contactor S has its coil S1 parallel connected through a pair of terminals TX and TY of apparatus 1B to coil K1C of contactor K1. This eliminates the few cycle delay between the closing of the contacts of S and those of K1C inasmuch as the contacts of both of these contactors are closed essentially simultaneously. Contacts SS2, when opened, break the holding circuit and concurrently deenergize contactor S and cut off the supply of power to apparatus 1B.

Another difference between the FIG. 6 apparatus and that of apparatus 1 and 1A is that further protection for the apparatus is provided by an over-voltage protector OV which has a sensing coil OVC connected across terminals TA and TB. In the event the voltage across these two terminals rises above a preselected level (for example, 20% over normal line voltage), normally closed contacts OV1 of protector OV (which are serially connected with contacts PC and contactor coil K1C) will open thus deenergizing contactor K1 and disconnecting the capacitors from the stator windings of motor M. Such an over-voltage condition, which could damage the capacitors, could arise if the capacitors remain connected across the stator windings of motor M after it has reached running speed.

Figure 7:
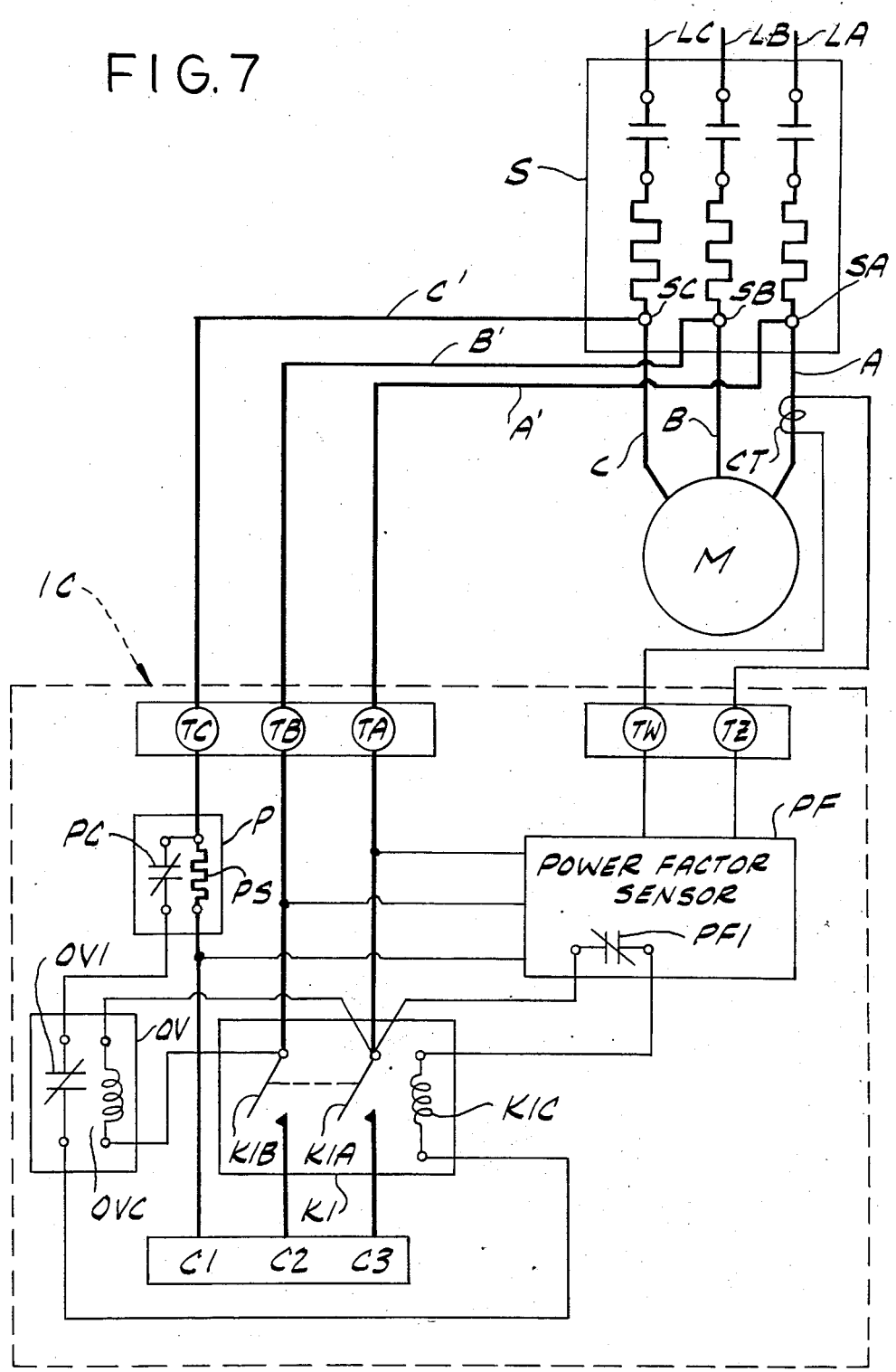

Apparatus 1C as shown in FIG. 7 illustrates another alternative embodiment of the present invention. It is quite similar to apparatus 1B of FIG. 6, differing principally in that instead of using a timer as indicated at T, a power factor sensing unit PF is utilized to determine when the capacitors are to be disconnected from motor M. The power factor of the motor at the instant of starting is at its lowest as there is maximum slip between the motor rotor and its stator. As the rotor speed increases this slip will decrease, the line current will fall and the power factor will increase. Sensor PF has its current sensing input connected through terminals TW and TZ to a through-type current transformer CT mounted on motor power lead A. The potential sensing inputs of PF are connected to the three conductors respectively interconnecting terminals TA, TB and TX to the capacitors C1-C3. Normally closed contacts PF1 are actuated to an open position during starting when the power factor of the motor increases to a predetermined value (established at a level somewhat below that which is exhibited by the motor at running speed) thereby deenergizing coil K1C of capacitor K1 and disconnecting capacitors C1–C3 from the stator windings of motor M.

It will be understood that the capacitors may also be interconnected in a wye configuration and that the apparatus of the present invention will operate effectively on wye- as well as delta-wound or connected motors. Further, if the operating voltage for the motor to which apparatus of the present invention is to be connected is substantially higher than 480 V or so, the electrolytic capacitors may be connected in series to increase the permissible level of operating voltage.

Also, it is to be noted that other means for controlling the capacitor contactor switching may be employed in accordance with the present invention. Thus not only may a timer or a power factor sensor be used to determine when the capacitors should be disconnected as running speed is approached, but as centrifugal switch responsive to rotor speed or a current sensor for sensing the decreasing motor current level as the rotor speed increases may also be used as means for controlling the switching components to disconnect the capacitors from the motor stator windings.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for reducing the voltage drop in an electrical power distribution system during the starting of a multi-phase induction motor having stator windings supplied therefrom and for decreasing the loss in starting torque of the motor comprising:
    a capacitor for direct connection across each stator phase winding of said motor;
    switching means for connecting and disconnecting the capacitors from the respective stator windings; and
    means for controlling the switching means to simultaneously disconnect the capacitors from the respective stator windings when the motor has substantially reached its running speed, the capacitors having a capacitance which is substantially independent of any capacitance employed to effect power factor correction during running operation and which exceeds that required to raise the no-load power factor of the motor to unity at running speed but is less than that which will correct the power factor of the motor to unity under locked rotor conditions;
    said capacitors being electrolytic-type capacitors having a capacitance which will reduce the motor starting current by at least approximately 30%;
    said switching means including normally open contacts in a circuit interconnecting the capacitors across respective stator windings;
    said control means including a coil shunt-connected across a stator winding of the motor and which when energized closes said contacts thereby shunt-connecting the capacitors across the respective stator windings and which when deenergized effects opening of the contacts to maintain the capacitors disconnected during operation of the motor at running speed wherein the control means further includes a timer connected in a circuit with the coil for deenergizing said coil and disconnecting the capacitors from across said stator windings after a predetermined time interval which substantially corresponds to that time required to bring said motor up to running speed; and
    protective means responsive to both the magnitude of current flow through the capacitors and the period of time said current flows for disconnecting said capacitors from said stator windings when the product of period of time said current flows and the square of the current exceeds a preselected level.

2. Apparatus as set forth in claim 1 which further includes a second protective means responsive to the voltage developed across at least one of said capacitors for disconnecting said capacitors from said stator winding when that voltage exceeds a predetermined value.

* * * * *